United States Patent [19]

Schmitt

[11] Patent Number: 4,733,239
[45] Date of Patent: Mar. 22, 1988

[54] RADAR ALTIMETER

[76] Inventor: Jerry C. Schmitt, 19930 Countryview Ter., Spring Hill, Kans. 66083

[21] Appl. No.: 583,668

[22] Filed: Feb. 27, 1984

[51] Int. Cl.$^4$ ............................................. G01S 13/34
[52] U.S. Cl. ....................................... 342/94; 342/122
[58] Field of Search ................. 343/12 A, 14; 342/91, 342/92, 94, 120, 122, 123, 124, 128; 328/145

[56] References Cited

U.S. PATENT DOCUMENTS

| | | | |
|---|---|---|---|
| 2,256,539 | 9/1941 | Alford | 342/122 X |
| 2,533,898 | 12/1950 | Robinson et al. | 342/122 X |
| 2,726,383 | 12/1955 | Dunn | 343/14 |
| 2,929,057 | 3/1960 | Green | 343/14 |

Primary Examiner—T. H. Tubbesing
Assistant Examiner—Gilberto Barrón, Jr.
Attorney, Agent, or Firm—Malcolm Reid

[57] ABSTRACT

A Radar Altimeter signal presence circuit which provides improved useable system sensitivity for a given false track probability by providing an improved method for detecting the adequacy of the return signal. This return signal is composed of many small, rapidly changing reflections that vary between additive and substractive combination giving the net return the characteristic of noise. A non-linear detector is used to enhance the signal presence detectors sensitivity to weak but adequate returns while (1) reducing the ability of short periods of strong returns to cause a positive signal presence indication when the overall signal is inadequate, and (2) retaining a high sensitivity to periods of signal fades that produce measurement errors. This is accomplished by using a non-linear detector that reduces the effect of strong returns when the many small reflections tend to combine additively, and increases the effect of weak returns when the many small reflections tend to combine subtractively.

3 Claims, 5 Drawing Figures

RADAR ALTIMETER

BACKGROUND OF THE INVENTION

1. Field of the Invention

The present invention relates to a radar altimeter having a non-linear signal presence circuit.

2. Prior Art

Radar altimeters, also often called radio altimeters, are used in aircraft to give the pilot an indication of his altitude above ground level (AGL) as opposed to the aircraft's barometric altimeter which is set to display the height above Mean Sea Level (MSL). Generally radar altimeters are used as a landing aid or in ground proximity warning equipment. Therefore, the range of measurement is generally limited to 2500 feet; and many commercial air carriers only display radar altitude to the pilot when the aircraft is below 500 feet AGL.

Frequency modulated-continuous wave (FM/CW) radar altimeters are so named because they transmit a CW signal that is swept in frequency as opposed to a pulse signal. The frequency sweep can have any number of shapes but a linear triangle or sawtooth are the most common.

The distance to the ground level, or the AGL altitude, is determined by measuring the frequency difference between the current transmitter frequency and a prior transmitter frequency delayed by the time required for the signal to propagate to the ground and back.

These prior art radar altimeters suffer from inadequate sensitivity to discriminate between reliable return signals which will produce an accurate altitude reading and return signals which produce erroneous altitude indications.

SUMMARY

DESCRIPTION OF THE PREFERRED EMBODIMENT

Figure 1:
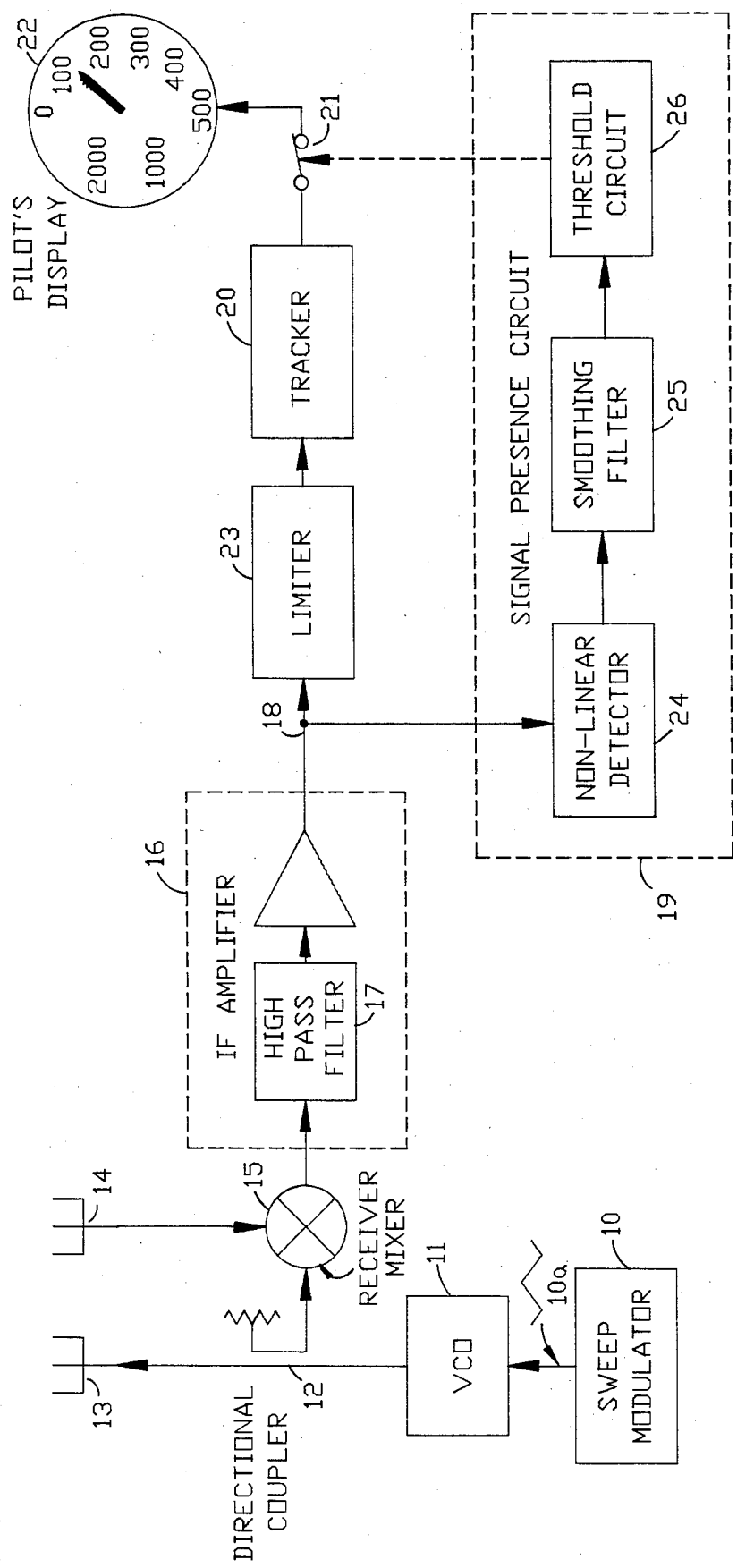
FIG. 1 is a block diagram illustrating a frequency modulated-continuous wave radar altimeter of the present invention having a non-linear signal presence circuit.

The FM/CW Radar Altimeter block diagram, FIG. 1, shows the salient features of the present invention. Modulator 10 produces a triangular sweep voltage 10a for application to voltage controlled oscillator (VCO) 11 of the transmitter. A small portion of the VCO output is coupled into the receiver mixer 15 through directional coupler 12 or by stray coupling between transmitter antenna 13 and receiver antenna 14 while the majority of the power is radiated toward the ground by transmitter antenna 13. Ground return re-enters the system through receiver antenna 14 to be mixed with the VCO injection in mixer 15. The mixer 15 output to the intermediate frequency (IF) amplifier 16 is a tone whose frequency is equal to the altitude times an altitude scale factor.

The altitude scale factor is a measure of the frequency difference between the transmitter VCO 11 frequency at a given instant and a prior transmitter VCO 11 frequency delayed by the time required for the signal to propagate to the ground and back. This frequency difference is proportional to the distance above the ground level. The frequency difference is equal to the AGL altitude times two nanoseconds per foot for two way propagation delay multiplied by the FM sweep rate expressed in Hertz per nanosecond. Typically, an altimeter will sweep 100 MHZ in 50 milliseconds which produces an altitude scale factor of 40 HZ/foot.

IF amplifier 16 contains a single pole high pass filter 17 whose 6 db per octave slope cancels out the altitude dependency of the return signal strength. This altitude dependency is the effect of diffusion of the signal reflected from the ground on its return trip to the altimeter receiving antenna. The longer the path, the greater the diffusion and loss of return signal strength. The total signal loss in the trip to the ground and back is referred to as external loop loss and includes the effect of diffusion of the return signal, antenna gain, ground reflectivity, and operating frequency. Therefore the IF output signal 18 strength will vary with the ground reflectivity and other design factors but not the altitude.

The amplitude of the IF output signal 18 is then measured in signal presence circuit 19 to determine if sufficient ground return exists for tracker 20 to produce an accurate altitude measurement. Limiter 23 is generally placed before the tracker 20 to remove all amplitude variations since the tracker 20 only acts upon the zero crossing of the IF output signal 18 voltage. If sufficient return exists the signal presence circuit 19 closes switch 21 passing the tracker output to the pilot's display 22.

Signal presence circuit 19 uses a nonlinear detector 24 to produce a pulsating DC voltage from the IF output signal 18. This pulsating DC voltage is then applied to smoothing filter 25 whose output is a slowly varying DC voltage level which increases in a manner indicative of tracker's 20 ability to measure the altitude accurately. Threshold circuit 26 then provides a gating signal to switch 21 closing switch 21 when the voltage from smoothing filter 25 exceeds a preset threshold and opening switch 21 when it does not exceed the preset threshold. Positive feedback within the threshold circuit 26 shifts the preset threshold slightly as the threshold is crossed over in order to add stability to the circuit and the overall operation of the altimeter.

Tracker 20 determines the altitude by measuring the IF output frequency, often by counting positive going zero crossings.

FM/CW radar altimeters may be divided into two groups - those of limited performance and those of full performance. Limited performance radar altimeters include designs that either use a single antenna for both receive and transmit or have little isolation between separate receive and transmit antennas. Full performance radar altimeters are those with sufficient isolation between separate receive and transmit antennas to virtually eliminate antenna leakage effects. Sufficient isolation may consist of nothing more than adequate physical separation or elimination of a line-of-sight configuration between the receive and transmit antennas.

These differences allow the full performance altimeter to be designed to track the altitude to zero feet whereas limited performance altimeters must reject return signals below approximately 20 feet above the ground. As a result, the limited performance altimeters generally lose the ability to accurately measure the altitude below 20 to 50 feet.

The limited performance design also tends to have lower sensitivity because of design restrictions brought on by the lack of antenna isolation.

Potentially all radar altimeters have difficulty determining when an adequate signal exists to present accurate altitude information. This problem is particularly accute in limited performance altimeters because of their lower sensitivity which forces the signal presence threshold to be set very low. The full performance design may be no better at determining the adequacy of the return signal, but the problem is masked since they have sufficient sensitivity to track virtually any return signal.

The erratic nature of the signal presence determination is partially due to the nature of the return signal. The ideal return in an FM/CW altimeter is a near audio tone with a frequency equal to a design constant, often 40 Hz/foot, multiplied by the altitude. In actual operation this case seldom if ever occurs because the return signal is a combination of tones of different frequencies, phases and amplitudes. This combination of tones is the result of the summation of ground returns from incremental areas within the transmit-receive antenna pattern. These incremental ground returns are at different frequencies and amplitudes due to the distance variation. They experience different ground reflection losses, have different Doppler frequency shifts due to the variation in vehicle motion relative to each incremental reflector, and have different amplitudes and phases due to the variation in the combined receive-transmit antenna gain in the direction of the incremental reflector.

This combination of signals has a complex spectrum that can be reasonably well represented by random noise limited to a band starting on the low frequency side at the return frequency produced by the closest ground return, and ending on the high frequency side at about 1.3 times the low frequency limit. The return frequency from the closest ground return is equal to the altitude scale factor mentioned earlier multiplied by the distance. The envelope of this noisy return contains low frequency components of relatively high amplitude that tend to confuse prior art peak detectors into indicating that an adequate return signal existed when in fact it does not.

Another major cause of difficulty in judging the adequacy of a return signal is the wide variation in the receiver mixer 15 injection signal found in limited performance radar altimeters. Full performance altimeters take a number of steps to control this problem, including the use of radio frequency (RF) circulators connected as RF isolators in the transmitter output to isolate the receiver injection from reflections at or near the transmitting antenna. Other steps are the use of power leveling to reduce or eliminate power output variations in the transmitter output and the use of widely separated antennas to eliminate significant coupling.

Figure 5:
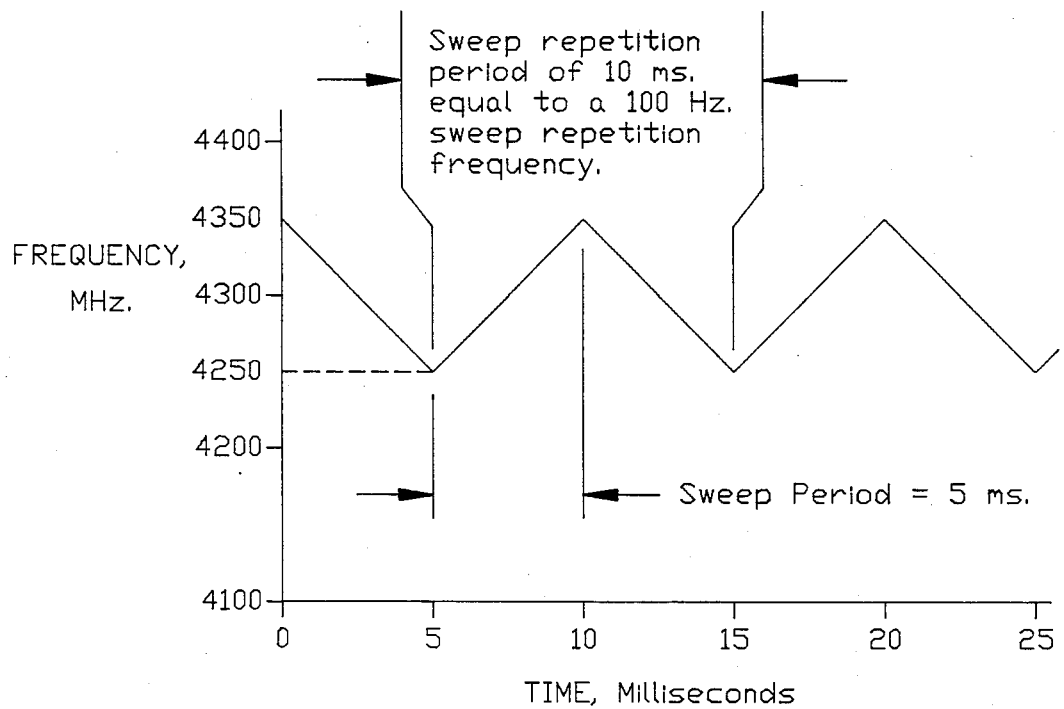
FIG. 5 is a graphical presentation of the transmitter frequency sweep of the radar altimeter.

In limited performance designs, little antenna isolation exists which results in a receiver mixer 15 injection signal rich in harmonics of the sweep frequency. These harmonics are formed through several mechanisms referred to here as system anomalies. One system anomaly results from the normal variation in transmitter power output which results in a variation of the receiver mixer 15 injection signal level as it sweeps its RF band range. Its band range is commonly designed to be from 4250 MHz to 4350 MHz. This variation in the receiver mixer 15 injection signal is particularly troublesome when the sweep reverses because the receiver mixer 15 injection signal variation is sharply reversed resulting in a strong burst of sweep period harmonics. Likewise, the antenna standing wave ratio magnitude and phase variations produce a signal that sums with the desired receiver mixer 15 injection signal to produce harmonics of the transmitter sweep repetition rate. FIG. 5 graphically illustrates the transmitter sweep repetition rate for the preferred embodiment.

These harmonics can easily have equivalent altitudes of 10 feet or more and account for the limited performance altimeters inability to track at these altitudes.

The composite return signal as seen in the altimeter IF is then composed of the expected thermal noise, the system anomaly noise, and the desired return signal. It is now the task of the signal presence detector 24 to make a careful judgement as to the adequacy of the desired return signal to produce an accurate output from the tracker 20. As stated earlier, prior art radar altimeters used peak or average voltage detectors. The average voltage detectors were less susceptable to system anomaly noise. However, even with the average voltage detectors of the prior art radar altimeters, the signal presence threshold for adequate signal was set at a high signal level in order to prevent system anomaly noise (system anomaly noise varies with the aircraft installation and with temperature induced shifts in the transmitted frequency) from producing a positive signal presence determination when the tracker 20 was unable to measure the altitude with satisfactory accuracy.

This invention comprises an improved signal presence circuit 19 with an improved ability to discern the tracker's 20 ability to produce a reliable altitude measurement from the IF output signal composed of the desired return signal, system anomaly noise, and thermal noise.

The characteristics of the ideal signal presence circuit 19 can be ascertained by studying the characteristics of the IF signal limiter 23 and tracker 20. Limiters are well known to suppress the weaker of the input signal components, be it thermal noise, system anomaly noise, or the desired return signal, and to enhance the strongest input signal components. In a good design, the desired return signal is the strongest component whenever the signal presence circuit indicates an adequate return signal. Therefore, the system anomaly noise and thermal noise are suppressed.

The radar altimeter's ability to track the aircraft altitude above the ground is determined by the weakest return received over the sweep interval; for, this is the point at which tracking errors occur. As previously discussed, the return will typically vary in amplitude across the sweep interval because it is a composite of many amplitudes, frequencies, and phases which will periodically pass through additive and subtractive combinations.

Figure 2:
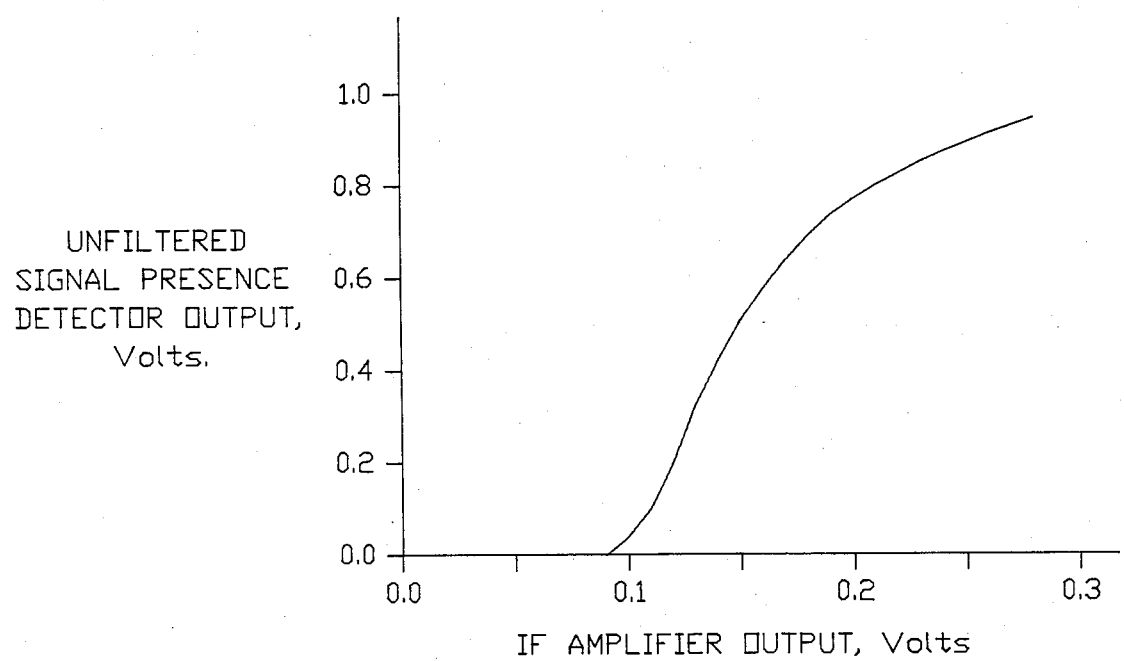
FIG. 2 is a graphical illustration of the relationship—the transfer function—between the input and the output of the non-linear signal presence detector of the radar altimeter of the present invention.

Therefore, the design objective of the present invention is to include within a radar altimeter, a non-linear instantaneous signal detector 24 that has a low gain at levels indicative of an inadequate return signal, a relatively higher gain at levels indicative of an adequate return and a reduced gain above this level. The input-output characteristics of such a non-linear detector 24 is shown in FIG. 2. This detector 24 output is then smoothed by a smoothing filter 25 over several sweep periods to produce a stable signal presence voltage which is injected into a threshold circuit 26, the output of which is the indication of adequate or inadequate signal presence. This threshold circuit 26 should also have positive feedback from its output back to its input in order to produce a hysteresis in the crossover point between the adequate and inadequate signal presence to further reduce the probability of repeated transitions between an adequate and inadequate signal presence indication.

It is important to note that the transfer function of circuits containing non-linear elements is dependent on the order in which the elements are placed. In the present invention it is important that the non-linear elements which produce the low gain at both low and high IF amplifier 16 output signal voltages be placed before the smoothing filter. For example, placing the non-linear gain element after the smoothing filter would not perform the desired function because that combination has greater sensitivity to the signal peaks.

The low sensitivity to low signal voltages can be obtained with a threshold circuit that only allows signals above some level to pass.

The desired non-linear gain reduction as the signal level increases can be obtained from a semiconductor junction since semiconductor junctions exhibit a well known non-linear (logrithmic) relationship between input current and voltage drop in the forward conduction direction. Here it is important to realize that the junction's departure from a true logrithmic function is an important feature since the log of zero is negative infinity. Thus a more ideal logrithmic device would produce large negative transients as the IF signal passed below the initial threshold and would not perform the desired function.

The system gain of the present invention needs to be set to properly position the initial threshold and following non-linear function properly, relative to the system noise.

The signal presence circuit 19 thus described is a form of matched filter designed to produce an optimum determination of adequate signal presence for a minimum probability of false determination.

CIRCUIT DESCRIPTION OF THE PREFERRED EMBODIMENT

Figure 3:
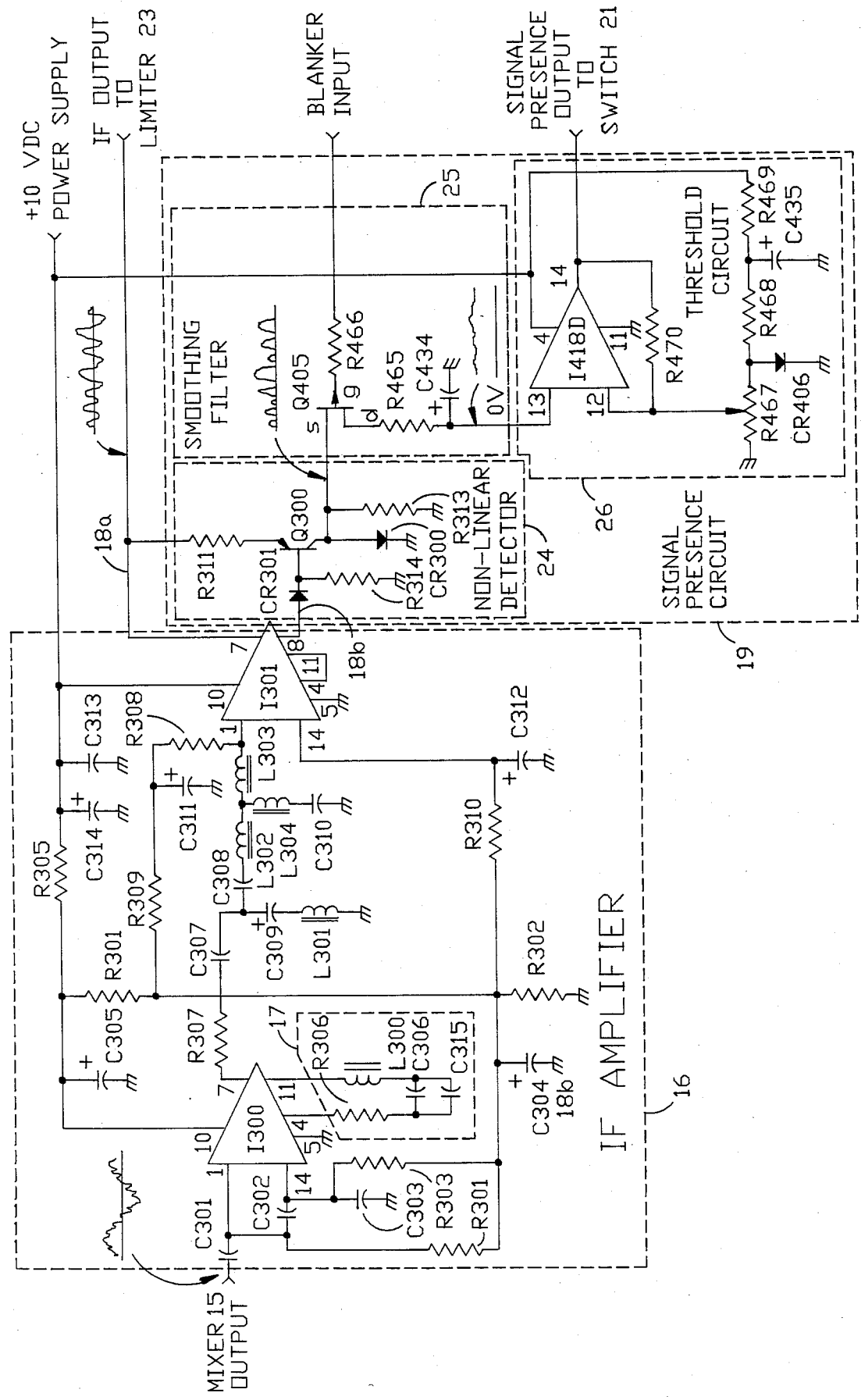
FIG. 3 is a schematic diagram of the non-linear signal presence circuit and intermediate frequency amplifier of the invention.
Figure 4:
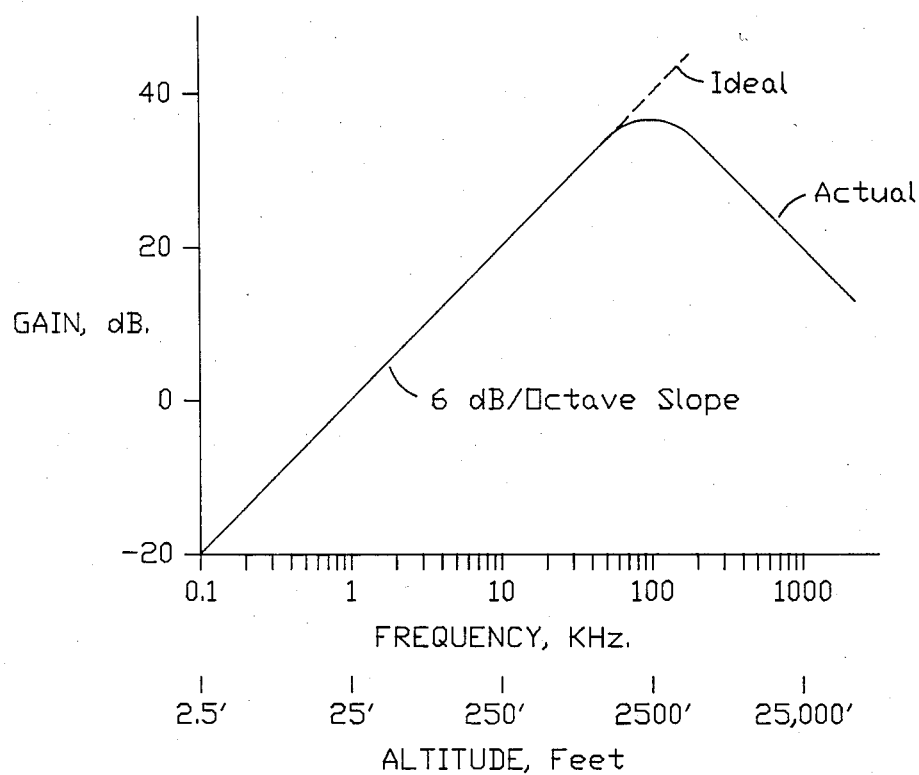
FIG. 4 is a graphical presentation of the gain characteristics of the radar altimeter's first intermediate frequency amplifier as a function of frequency and of altitude.

FIG. 3 shows a schematic diagram of a signal presence circuit 19 utilizing the improved techniques described above under Summary Description of the Preferred Embodiment. IF amplifier 16 contains several stages of amplification, high pass filter 17, and several other filters as will be described. I-300 is a NE-592N video amplifier integrated circuit which amplifies the IF signal received from the receiver mixer 15 with a gain linearly proportional to the return frequency. This gain characteristic removes the altitude component of the altimeter loop loss function in order to make the signal presence circuit 19 possible. The actual gain slope is obtained from the active filter feature of I-300 in conjunction with R-306 (15 Ohm), L-300 (82.5 uH) and C-306 (0.033 uF) in parallel with C-315 (0.0047 uF). These later four components along with the internal series resistance of I-300 and the active filter feature of I-300 form a two pole bandpass response with a Q of one (1) and 100 KHz center frequency. This center frequency matches the IF frequency for the desired 2500 foot maximum altitude. Therefore, over the altitude range of interest, this first IF amplifier 16 has the desired gain-proportional-to-altitude characteristic as shown in FIG. 4. Note that in FIG. 4 the y axis is expressed both in frequency and altitude for a 40 Hz/ft altimeter scale factor.

Two-three pole elliptic filters between the first and second IF amplifier stages limit the overall frequency response to the altitude range of interest. The three pole elliptic high pass filter, comprised of C-307 (0.22 uF), C-308 (0.22 uF), C-309 (3.3 uF) and L-301 (28.7 mH) has a corner frequency at 1600 Hz which is equivalent to 40 feet. This filter is necessary to reject anomaly signals in the IF that occur at harmonics of the transmitter sweep repetition frequency. The transmitter sweep repetition frequency is graphically illustrated in FIG. 5.

The three pole elliptic low pass filter composed of L-302 (0.67 mH), L-303 (0.67 mH), L-304 (0.30 mH) and C-310 (0.0047 uF) has a cut off frequency of 100 KHz equivalent to 2500 feet. This filter prevents the production of false tracks due to strong ground returns when flying above the altimeters maximum design altitude. It also rejects thermal noise in the IF at frequencies above 100 KHz.

R-307 (220 Ohm) in conjunction with the source resistance of I-300 and R-308 (300 Ohm) provides a matched source and load termination for the preceeding elliptic filters.

I-301, a second NE-592N video amplifier integrated circuit, amplifies the remaining signal to a level suitable for the limiter 23 and signal presence circuit 19. The limiter 23 provides the signal for the altitude tracker 20 and subsequent pilot's display 22. The signal presence circuit 19 determines when the return signal is adequate for the tracker 20 to perform with adequate accuracy.

The remaining components associated with I-300 and I-301 provide biasing and de-coupling for these IC's using conventional techniques.

Signal presence circuit 19 is formed from nonlinear detector 24, smoothing filter 25, and threshold circuit 26. Nonlinear detector 24 uses the phase reversed outputs of I-301. 18a and 18b, as inputs since both 18a and 18b will have the same DC bias level thus eliminating the need for blocking capacitors. The forward base-emitter voltage drop of Q-300, and MPS-6519 transistor, prevents detection of signals below some minimum voltage as shown in FIG. 2. However, this voltage drop is subject to a significant temperature coefficient. Therefore, CR-301, a 1N4148 diode, is added to significantly diminish this temperature dependency. R-314 (68 KOhm) provides a small current through CR-301 to keep it slightly in conduction while still not cancelling out all the forward base-emitter voltage drop of Q-300 used as a minimum detection threshold.

As the IF output signal 18 received at the base-emitter junction of Q-300 through R-311 (4300 Ohm) and CR-301 exceeds the voltage to produce significant conduction, an output current from Q-300's collector begins to flow. Because Q-300 is a PNP transistor this current flow only occurs when IF output signal 18b is negative with respect to IF output signal 18a thus producing a pulsating DC current at Q-300's collector terminal. The value of this current is controlled by R-311.

The instantaneous logrithm of this current is obtained by passing it through silicon diode CR-300, also a 1N4148, whose instantaneous voltage drop equals the logrithm of the forward current. Voltage 401 is then the instantaneous log of the signal above a desired threshold.

It is then passed through Junction FET switch Q-405, a 2N5461 transistor, to a single pole low pass filter composed of R-465 (100 KOhm) and C-434 (1 uF) to smooth the resulting signal presence voltage over a period of several sweeps of the VCO 11. Junction FET switch Q-405 opens when the VCO sweep reverses direction and remains open for 20% of the following sweep (1 msec.) to reject the transients that follow the sweep reversal. During this period the tracker 20 stops processing to avoid errors caused by these transients. Ideally a unity gain buffer amplifier should be placed between voltage 401 and smoothing filter 25. However it has been found sufficient to use resistor R-313 (47 KOhm) to provide a slight current bleed for the smoothing filter 25.

The smoothed voltage 402 is applied to the threshold circuit 26 composed of operational amplifier I-418D (¼ CA224), R-470 (150 KOhm), R-467 (a 10 KOhm potentiometer), R-468 (120 KOhm), C-435 (1 uF) and R-469 (12 KOhm). This circuit produces a logic high output voltage (+10 VDC) when the smoothed voltage 402 is below the voltage on I-418D pin 12 and a logic low (0 VDC) when it is above the voltage on I-418D pin 12. The voltage on I-418D pin 12 is primarily set by potentiometer R-467 using CR-406 for a reference. CR-406 serves both as a reference and as a means of cancelling the remaining effects of temperature on the signal presence circuit 19. The temperature cancelling effect results because CR-406 has the same temperature coefficient as CR-300. R-468 and R-469 provide the current to CR-406 while C-435 in conjunction with R-469 filters out noise on the +10 VDC power supply line.

R-470 provides the positive feed back around I-418D that shifts the voltage at I-418D pin 12 slightly as the threshold is crossed. Because this is positive feedback, the direction of the shift is away from voltage 402. This provides about 3 db of hysteresis in order to prevent repeated transitions between the track and no-track conditions.

Adjustment of the signal presence threshold is provided with R-467 in order to compensate for unit to unit gain variations.

The signal presence circuit 19 output is then sent to switch 21 to control the presentation of radar altitude on the pilot's display 22. This control voltage has a negative logic sense. Therefore, a high output turns switch 21 off and a low output turns switch 21 on.

While I have disclosed a preferred embodiment description and application of the invention, other modifications of the invention not specifically desclosed or referred to will be apparent to those skilled in the art in light of the foregoing description. This description is intended to provide a concrete example of a preferred embodiment structure and application clearly disclosing the present invention and its operative principles. Accordingly, the invention is not limited to any particular embodiment or configuration of component parts. All alternatives, modifications, and variations of the present invention which fall within the spirit and broad scope of the appended claims are covered.

What is claimed is:

1. A radar altimeter for determining the altitude of an object above a surface comprising:
   (a) a frequency modulated radar transmitter adapted to transmit a continuous frequency wave;
   (b) a receiver adapted to receive a frequency modulated radio frequency continuous wave reflected from a surface, the receiver having (i) a mixer means whereby the reflected wave and a portion of the transmitter output are combined, and (ii) a means to amplify the mixer means output signal;
   (c) a signal presence means adapted to produce an output signal when the radar altimeter is receiving an adequate reflected wave from a surface, comprising:
      (i) a means for producing an input signal to a smoothing filter means, the level of which is the approximate logarithm of the receiver output level when the receiver output level exceeds a pre-set minimum and approaches zero when the receiver output level is below the pre-set minimum;
      (ii) a smoothing filter means that integrates its input signal level as a function of time; and
      (iii) a threshold means for producing an output signal only when the output of the smoothing filter exceeds a reference level;
   (d) a tracker means for producing a signal, the amplitude of which is proportional to the receiver output frequency and thereby proportional to the altitude;
   (e) a switch means for gating the output of the tracker means off when an output signal from the signal presence means is at one level and for gating the output of the tracker means on when an output signal from the signal presence means is at another level, thereby ensuring that the radar altimeter is producing an output only during periods when the radar altimeter is producing reliable altitude indications.

2. An altimeter as recited in claim 1, wherein the means for amplifying the mixer means output signal provides phase reversed outputs, and wherein the means for producing an input signal, the level of which approaches zero when the receiver output level is below the pre-set minimum, to the smoothing filter means comprises a transistor having its base and emitter connected to said phase reversed outputs.

3. An altimeter as recited in claim 2, wherein the means for producing an input signal, the level of which is the approximate logarithm of the receiver output level when the receiver output level exceeds a pre-set minimum, to the smoothing filter means also comprises a diode biased in the forward conduction region having as its input the current flowing from the collector to the base of said transistor.

* * * * *